United States Patent Office 3,163,634
Patented Dec. 29, 1964

---

3,163,634
DYESTUFFS CONTAINING METAL IN COMPLEX COMBINATION
Karl F. Conrad, Eggertsville, N.Y., assignor to Allied Chemical Corporation, New York, N.Y., a corporation of New York
No Drawing. Filed Nov. 19, 1959, Ser. No. 854,025
3 Claims. (Cl. 260—145)

This invention relates to dyestuffs containing metal in complex combination, and specifically to the class of dyestuffs which are metallized monoazo dyestuffs containing chromium and cobalt. It relates more particularly to novel chromium-containing and cobalt-containing monoazo dyestuffs which are particularly suitable for dyeing animal fibers (such as wool) and synthetic fibers of the polyamide type (such as nylon) from neutral dyebaths.

The dyestuffs of the present invention are chromium-containing and cobalt-containing metal complex derivatives of monoazo dyestuffs of the benzene-azo-naphthalene series in which the benzene and naphthalene components each contain a hydroxyl radical in ortho-position to the azo radical, the benzene component contains at least one of the group consisting of nitro, halogen, lower alkyl and lower alkoxy as sole additional substituents, and the naphthalene component contains a lower alkoxy radical in para-position to the hydroxyl group as sole additional substituent.

Those dyestuffs containing less than one atom of one of said metals per molecule of metal-containing dyestuff, and especially those containing about 1 atom of one of said metals for each 2 molecules of metal-containing dyestuff, are preferred in view of their superior dyeing properties.

The dyestuffs of the present invention containing chromium in complex combination are of particular value for the dyeing of natural or synthetic polyamide fibers, such as wool and nylon, from neutral dyebaths. Nylon and wool dyeings so obtained are distinguished by their level character and excellent fastness to light and to washing.

I have discovered that the metal-containing dyestuffs produced by converting to their chromium and cobalt complexes the monoazo dyestuffs having the following formula:

(I)
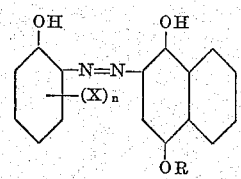

wherein

X is selected from the group consisting of nitro, halogen, lower alkyl and lower alkoxy,
n is a whole number not exceeding 3, and
R is a lower alkyl radical, dye animal fibers and synthetic polyamide fibers, from neutral or weakly acid baths, level reddish-blue to blue-black shades having excellent fastness to light and to washing.

The chromium-containing dyestuffs dye wool and synthetic polyamide fibers level greenish-gray to black shades. The cobalt-containing dyestuffs dye said fibers level bluish shades.

The present invention includes, as an additional feature thereof, metal-containing complexes of a mixture of two monoazo dyestuffs of which mixture both are of said class, or preferably of which mixture at least 25 mol percent is a dyestuff of said class and the remainder is a supplemental metallizable monoazo dyestuff obtained by coupling a member of the group consisting of ortho-aminophenols and ortho-aminonaphthols with a coupling component of the naphthalene, pyrazolone and acetoacetamide series.

Examples of supplemental metallizable monoazo dyestuffs are:

4-sulfamido-2-aminophenol→1-(3'-chloro)-phenyl-3-methyl-5-pyrazolone
4-nitro-2-aminophenol→2-naphthol
5-chloro-2-aminophenol→5,8-dichloro-1-naphthol
1-amino-2-naphthol-6-sulfonamide→acetoacetanilide
4-nitro-6-chloro-2-aminophenol→1-naphthol
2-amino-1-hydroxy-5-sulfonamido-benzene→2,3-hydroxy-naphthoic anilide.

The dyestuffs of the present invention are obtained by metallizing a monoazo dyestuff of the type referred to above with a suitable metallizing agent. For example, a monoazo dyestuff having the above Formula I is heated with a chromium-yielding or cobalt-yielding agent in aqueous solution. Suitable chromium-yielding agents are, for example, chromic formate, chromic fluoride, chromic sulfate, potassium chromic sulfate, ammonium chromic sulfate, and chromium organic acid complexes. Suitable cobalt-yielding compounds are, for example, cobaltous chloride, cobaltous sulfate and cobaltous organic acid complexes.

It is particularly advantageous to carry out the metallization in an aqueous alkaline medium and to use as the metallizing agent an organic acid complex of the metal, a number of which are known; as, for example, a chrommalic acid complex, a chrom-tartaric acid complex, a cobaltous malic acid complex, and the like.

The amount of metallizing agent employed in proportion to the monoazo dyestuff intermediate may vary. While amounts of metallizing agent equivalent to one atom of metal per molecule of monoazo dyestuff can be used, I prefer to employ a smaller proportion of the metallizing agent since the properties of the resulting metal-containing dyestuffs are more advantageous, especially when the metallized dyestuff contains about one atom of chromium or cobalt in complex combination with two molecules of the monoazo dyestuff.

Hence, in the preferred practice of the present invention, an amount of metallizing agent is used containing less than 2 atoms of metal, and preferably about 1 atom of metal, for each 2 molecules of monoazo dyestuff intermediate or mixture of monoazo dyestuff intermediates.

For the production of metal-containing complexes of a plurality of monoazo dyestuffs, a mixture of (1) a monoazo dyestuff having the above Formula I and (2) a metallizable monoazo dyestuff having the following formula:

(II)  A—N=N—B wherein

A is the radical of an o-aminophenol or an o-aminonaphthol, and
B is the radical of a naphthol, a pyrazolone or an acetoacetamide coupling component, which mixture contains at least 25 mol percent of (1) and the remainder of (2), is subjected to a metallizing treatment in the manner set out above. Thus, a mixture of 3.5 mols of (1) the monoazo dyestuff obtained by alkaline coupling of diazotized 2-amino-4-nitrophenol with 1-hydroxy-4-methoxy-naphthalene (which corresponds to 35 mol percent of the mixture), and 6.5 mols of (2) the monoazo dyestuff obtained by the alkaline coupling of diazotized 1-amino-2-hydroxy-6-nitronaphthalene-4-sulfonic acid with beta-naphthol (which corresponds to 65 mol percent of the mixture) can be metallized by heating with a chrom-tartaric acid complex of the type employed in Example 6 below (containing 5 atoms of chromium; that is, in the proportion of two molecules of the dyestuff mixture per atom of chromium) to form a dark powder dyeing wool and nylon from a neutral dyebath level neutral gray to jet black shades of excellent fastness to light and to washing.

The monoazo dyestuffs employed as intermediates for the formation of said metallized dyestuffs of the present invention can be obtained readily by diazotizing a 2-amino-phenol having the following formula and coupling with 1-hydroxy-4-alkoxynaphthalene having a maximum of 6 carbons atoms in the alkyl group:

(III) 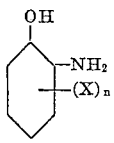

wherein X and $n$ have the above meaning.

The coupling is best carried out in a weakly alkaline medium and the monazo compounds thus produced are preferably precipitated by the addition of salt and then isolated in any convenient manner, as by filtration, centrifugation, and the like.

Suitable 2-amino-phenols having Formula III include:

4-nitro-2-aminophenol
5-nitro-2-aminophenol
4-chloro-2-aminophenol
5-chloro-2-aminophenol
4,6-dichloro-2-aminophenol
4-chloro-6-methyl-2-aminophenol
4-nitro-6-methyl-2-aminophenol
4-nitro-6-butoxy-2-aminophenol
6-nitro-4-chloro-2-aminophenol
4,6-dinitro-2-aminophenol
4-ethoxy-2-aminophenol
5-methyl-2-aminophenol
6-chloro-4-nitro-aminophenol
6-methoxy-4-nitro-aminophenol
6-chloro-4-methoxy-aminophenol Suitable 1-hydroxy-4-alkoxynaphthalene coupling components include:

1-hydroxy-4-methoxy-naphthalene
1-hydroxy-4-ethoxy-naphthalene
1-hydroxy-4-propoxy-naphthalene
1-hydroxy-4-butoxy-naphthalene
1-hydroxy-4-amoxy-naphthalene
1-hydroxy-4-hexoxy-naphthalene In addition to their use for dyeing animal and synthetic polyamide fibers from aqueous dyebaths, the novel dyestuffs can be employed for spin-dyeing synthetic fibers as well as for coloring lacquers and synthetic resins and plastics.

The invention will be illustrated by the following specific examples, but it is to be understood that it is not limited to the details thereof and that changes may be made without departing from the scope of the invention. The temperatures are in degrees centigrade and the parts and percentages are by weight.

*Example 1*

*Part A.*—7.5 parts of 2-amino-4-nitrophenol were dissolved in a solution of 12.4 parts of hydrochloric acid (20° Baumé) in 115 parts of water and diazotized with 3.5 parts of sodium nitrite at 5°–10°. The resulting diazo solution was run into a solution of 9 parts of 1-hydroxy-4-methoxynaphthalene, 5.9 parts of 50% sodium hydroxide and 3.1 parts of sodium carbonate in 60 parts of water. The mixture was stirred for sixteen hours (overnight) and the resulting monoazo compound was precipitated by addition of sodium chloride (sufficient to make an approximately 5% solution). The mixture was heated to 70°, filtered hot, and the filter-cake of monoazo compound was washed with 10% aqueous sodium chloride solution and dried. It had the formula

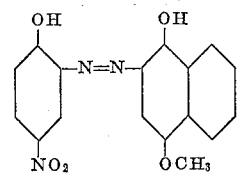

*Part B.*—The resulting monoazo compound was metallized by heating it with a chrom-tartaric acid complex in the following manner. The product of Part A of this example was stirred into 400 parts of water. To the suspension there were added 3.6 parts of sodium hydroxide and 0.1 part of a non-ionic dispersing agent (a polyoxyethylene derivative of sorbitan monolaurate sold as "Tween 20"), the mixture was heated to 90°, and to it was added a chrom-tartaric acid complex which had been prepared by reacting 9.5 parts of basic chromic sulfate containing 24.5% $Cr_2O_3$ (equivalent to 2.33 parts of Cr), 13.8 parts of tartaric acid and 23 parts of 50% sodium hydroxide solution in 150 parts of water. The mixture was heated at 93°–98° for about four hours, after which 65 parts of sodium chloride were added and the pH of the mixture was adjusted to slight alkalinity to Delta paper by the addition of about 25 parts of hydrochloric acid (20° Baumé). The resulting precipitate of chromium-containing monoazo dyestuff complex was filtered off, dried at 80°–90°, and ground. A dark powder was obtained which dyed wool and nylon fibers from a neutral dyebath in greenish black shades of excellent fastness to light and to washing.

*Example 2*

The monoazo dyestuff having the formula

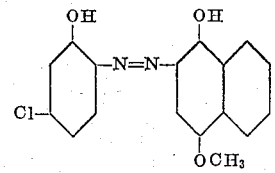

was prepared by the process of Example 1, Part A, from 2-amino-5-chloro-phenol and 1-hydroxy-4-methoxy-naphthalene, and the resulting dyestuff was converted to its chromium complex by the process of Example 1, Part B. The resulting dark powder dyed wool and nylon fibers from a neutral dyebath in fast greenish grey shades.

*Example 3*

The monoazo dyestuff obtained by substituting 2-amino-4-chloro-phenol for the 2-amino-5-chloro-phenol of Example 2 was converted to its chromium complex in the manner similar to that of Example 1, Part B, employing a chrom-malic acid complex as the chroming agent. The resulting dark powder dyed wool and nylon fibers from a neutral dyebath level, fast reddish blue shades.

*Example 4*

The monoazo dyestuff obtained by substituting 2-amino-6-chloro-4-nitro-phenol for the 2-amino-4-chloro-phenol employed in Example 3 was converted to its chromium complex in the manner employed in Example 3. The resulting dark powder dyed wool and nylon fibers from a neutral dyebath level, fast yellowish green shades.

*Example 5*

The monoazo compound obtained in Example 1, Part A, was metallized by heating it with a cobalt-malic acid complex in the following manner. A mixture of 25 parts of cobalt chloride ($CoCl_2 \cdot 6H_2O$), 30 parts of malic acid and 200 parts of water was heated to 70° and made alkaline to phenolphthalein with aqueous sodium hydroxide.

The resulting cobalt malate solution was added to an aqueous slurry of 15.4 parts of the monoazo compound, and the mixture was heated to 95° for 16 hours to effect metallization. The hot reaction mixture was sludge filtered, and the dyestuff was isolated by salting out, filtering off the precipitate, drying and grinding. A dark powder was obtained which dyes wool and nylon fibers from neutral dyebaths level reddish-black shades having excellent fastness to light and to washing.

*Example 6*

The monoazo compound produced by diazotizing 7.5 parts (0.487 mol) of 2-amino-4-nitro-phenol and coupling with 9.0 parts (0.52 mol) of 1-hydroxy-4-methoxynaphthalene according to the details given in Example 1, Part A, and the monoazo compound obtained by diazotizing 11.5 parts (0.404 mol) of 1-amino-2-hydroxy-6-nitronaphthalene-4-sulfonic acid and coupling with 6.8 parts (0.47 mol) of 2-hydroxynaphthalene were heated to 90° in admixture with 800 parts of water, 7.2 parts of 50% sodium hydroxide solution and 0.2 part of the non-ionic dispersing agent employed in Example 1, Part B ("Tween 20"). A chrom-tartaric acid complex prepared from 19 parts of basic chromic sulfate containing 24.5% $Cr_2O_3$ (equivalent to 3.23 parts of Cr), 27.6 parts of tartaric acid, 46 parts of 50% sodium hydroxide solution and 300 parts of water was added to the mixed dyestuff suspension, the mixture was heated to 93° to 98° for about four hours, and then 130 parts of sodium chloride were added. The pH of the mixture was adjusted to Delta paper by the addition of about 50 parts of hydrochloric acid (20° Baumé). The resulting precipitate of mixed chromium-containing complexes was filtered off, dried at 80° to 90°, and ground. A dark powder was thus obtained which dyes wool and nylon fibers from neutral dyebaths level black shades having excellent fastness to light and to washing.

The following examples illustrate additional metallized complexes resulting from metallizing a mixture of the monoazo compound of Example 1, Part A, with the supplemental monoazo dyestuff set out in the following table, by the process given above at the bottom of column 2 and top of column 3. The shades of the dyeings on wool and nylon fibers from neutral dyebaths are set out in the table.

TABLE

| Example No. | Supplemental Monoazo Dyestuff | Shade of Dyeing on Wool and Nylon |
| --- | --- | --- |
| 7 | 4-sulfamido-2-aminophenol→1-(3'chloro)-phenyl-3-methyl-5-pyrazolone. | Brownish Black. |
| 8 | 4-nitro-2-aminophenol→2-napthol | Bluish Black. |
| 9 | 5-chloro-2-aminophenol→5,8-dichloro-1-naphthol. | Do. |
| 10 | 1-amino-2-naphthol-6-sulfonamide→acetoacetanilide. | Brownish Black. |
| 11 | 4-nitro-6-chloro-2-aminophenol→1-naphthol | Jet Black. |
| 12 | 2-amino-1-hydroxy-5-sulfonamido-benzene→2,3-hydroxy-naphthoic anilide. | Reddish Black. |

I claim:
1. Metallized azo dyestuffs selected from the group consisting of chromium-containing and cobalt-containing metal complex derivatives of a mixture of at least 25 mol percent of:
   (1) a monoazo dyestuff of the benzene-azo-naphthalene series in which the benzene and naphthalene components each contain a hydroxyl radical in ortho position to the azo radical, the benzene component further contains one to two substituents of the group consisting of nitro, chlorine, lower alkyl and lower alkoxy radicals as sole additional substituents, and the naphthalene component contains a lower alkoxy radical in para-position to the hydroxyl group as sole additional substituent,
and the remainder of
   (2) another metallizable monoazo dyestuff selected from the group consisting of:
      1-amino - 2 - hydroxy-6-nitronaphthalene-4-sulfonic acid→2-naphthol
      4-sulfamido - 2 - aminophenol→1 - (3'-chloro)-phenyl-3-methyl-5-pyrazolone
      4-nitro-2-aminophenol→2-naphthol
      5-chloro-2-aminophenol→5,8-dichloro-1-naphthol
      1-amino-2-naphthol - 6 - sulfonamide→acetoacetanilide
      4-nitro-6-chloro-2-aminophenol→1-naphthol
      2 - amino-1-hydroxy - 5 - sulfonamido-benzene→2,3-hydroxy-naphthoic anilide
   said metal being present in an amount equal to about one atom per one to two molecules of said mixture of monoazo dyestuffs.

2. Chromium-containing metal complex derivatives of a mixture of at least 25 mol percent of (1) the monoazo dyestuff having the formula

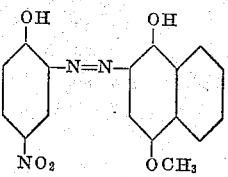

and (2) the remainder of the monoazo dyestuff obtained by alkaline coupling of diazotized 1-amino-2-hydroxy-6-nitronaphthalene-4-sulfonic acid with beta-naphthol, the chromium being present in an amount equal to about one atom per one to two molecules of said mixture of monoazo dyestuffs.

3. Chromium-containing metal complex derivatives of a mixture of monoazo dyestuffs as defined in claim 2, wherein chromium is present in an amount equal to about one atom per two molecules of said mixture of monoazo dyestuffs.

References Cited in the file of this patent
UNITED STATES PATENTS

| 833,605 | Julius | Oct. 16, 1906 |
| 2,452,171 | Straub et al. | Oct. 26, 1948 |
| 2,674,515 | Widmer et al. | Apr. 6, 1954 |
| 2,806,760 | Brassel et al. | Sept. 17, 1957 |
| 2,936,304 | Neier et al. | May 10, 1960 |

FOREIGN PATENTS

| 1,170,745 | France | Sept. 29, 1958 |